April 10, 1928.
E. R. SPIEGEL
REPORT BOARD
Filed Sept. 30, 1927
1,665,568
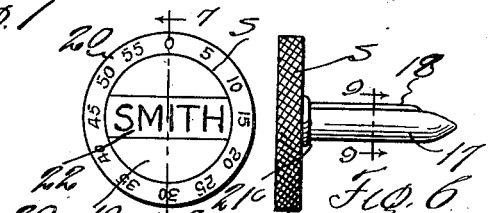
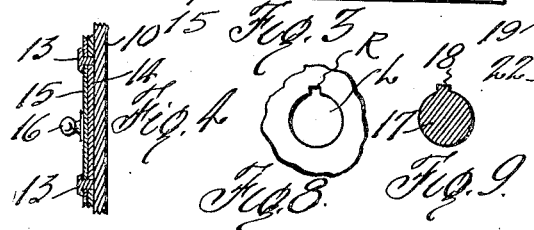
INVENTOR
E. R. Spiegel
BY
ATTORNEY Patented Apr. 10, 1928.

1,665,568

UNITED STATES PATENT OFFICE.

EDWARD R. SPIEGEL, OF DALLAS, TEXAS, ASSIGNOR OF ONE-HALF TO JOHN W. MILLER, OF DALLAS, TEXAS.

REPORT BOARD.

Application filed September 30, 1927. Serial No. 223,176.

This invention relates to new and useful improvements in report boards.

One object of the invention is to provide a board having provision for designating the use of articles or other data for periods of time, together with means for indicating the particular period involved in each instance, coupled with the name of the person involved.

Another object of the invention is to provide a movable indicator having an adjustable portion and indicating divisions of an hour together with a name plate for indicating a particular person or thing.

A further object of the invention is to provide a report board provided with vertical columns for hours of the day and having spaces for receiving indicators arranged in transverse divisions registering with display spaces, whereby certain data or information may be correlated with particular transverse divisions.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is an elevation of a report board constructed in accordance with my invention, Fig. 2 is an edge view of one of the slides, Fig. 3 is a face view of the same, Fig. 4 is a vertical sectional view on the line 4—4 of Fig. 1, Fig. 5 is a front view of one of the indicators, Fig. 6 is a side view of the same, Fig. 7 is an enlarged transverse sectional view on the line 7—7 of Fig. 5, Fig. 8 is a detail of one of the indicator sockets, and Fig. 9 is a cross-sectional view on the line 9—9 of Fig. 6.

While my invention may be applied to report boards for various uses, I have chosen as an illustration a report board for use by automobile salesmen, but it is to be understood that the invention is not to be limited to such use.

In the drawings the numeral 10 designates a board made of any suitable material and finished in any suitable manner for mounting on a wall or other desirable location. The board may have a clock 11 at its top, or this may be omitted.

The top of the board proper is provided with a transverse space 12 in which suitable information or other data may be printed or painted. A large portion of the board is divided into vertical columns A, which are sub-divided into small spaces B by horizontal lines C. At one side of the board transverse guide strips 13 are provided in alignment with the lines C so that slides 14 arranged in said guideways will register with the spaces B. By omitting alternate lines C, panels D are provided and these may be covered with black-board or other equivalent material so that remarks or other information may be readily written therein. For each panel D is provided a pair of transverse panels F and G at the side of the board. In each panel F is displayed the name of the salesman and in each panel G a pair of indicator sockets H are provided.

At the top of each column A is a space I in which is printed or painted a numeral indicating one of the hours of the day. In this particular instance the first numeral used is "8" indicating eight o'clock in the morning when the salesmen start working; while the last space I also bears the numeral "8" indicating the hour at which the salesmen cease working. A panel J is provided at the left side of the board above the slides 14 and this is painted or printed with a suitable caption for the data printed on said slides.

As is shown in Figs. 2, 3 and 4 each slide 14 is provided with a removable plate 15 so that the information carried by the slide may be changed. Each slide also has a knob 16 by which it may be removed. The slides occupy substantially half the length of the guideways formed by the strips 13. By moving any slide to the right, it is thereby differentiated from the other slides and also is brought to a position contiguous to a particular transverse row of spaces B.

At the top of each space B is provided an indicating point or mark K, while in the central portion of each space a socket L is provided. Each socket has a keyway R, as is shown in detail in Fig. 8.

For each salesman a pair of indicators S are provided. The indicators of each pair are painted so as to be readily distinguished from each other. For instance, one may be white and the other black. Each indicator comprises a stem 17 pointed at its rear end so as to readily enter the socket L and having a longitudinal key 18 for engaging in the keyway R, whereby the stem is held against rotation.

On the stem of each indicator, a circular head 19 is rigidly fastened and this head is countersunk in a rotatable rim member 20 confined by an annular bead 21 on the stem, as is shown in Fig. 7. A removable name plate 22 is mounted in the face of the head 19, as is shown in Figs. 5 and 7. On the face of the rim member numerals are placed indicating divisions of an hour. Each member 20 is of such diameter as to register with the marks K.

In using the board the salesman selects the car he wishes to demonstrate and moves the slide 14 bearing the name of the particular car to the right, as is indicated in Fig. 1. He then removes one of the indicators S bearing his name from its socket H. If he desires to take the car out at 10:30 in the morning, he inserts the stem 17 in the socket L of the space B opposite the slide which he has moved in the column A, having "10" at its top. He then rotates the rim member 20 until the numeral 30 is brought into registration with the mark K. He would select the white indicator designating the car was to be taken during a morning hour. The salesman would then take the other indicator of his pair, which indicator would be black or otherwise distinguished from the first indicator, so as to show that the car was to be returned at the hour designated. The reason for distinguishing the indicators is mainly to indicate the time the car is to be taken out and the time it is to be returned and both indicators may be used during the morning hours or during the afternoon and evening hours, or one used during the morning hours and the other used during the afternoon and evening hours. If the car was to be returned at 2:15 o'clock the salesman would insert the indicator S in the space of the column having "2" at its top and in transverse alignment with the first indicator. He would then rotate the member 20 until the numeral "15" registered with the mark K.

It is to be understood that as each car is taken out the indicators are properly placed. This would enable one to readily ascertain from the board when the cars were taken, or when they were to be taken, and the hour at which they were to be returned, together with the name of the salesman using the car. It would be possible for two salesmen to use the same car during periods which did not conflict and this could be readily indicated on the board.

Various changes in the size and shape of the different parts, as well as modifications and alterations, may be made within the scope of the appended claims.

What I claim, is:

1. A report board comprising a plurality of vertical columns including transversely alined spaces, designations opposite each transverse row of spaces, each column having a time indicating numeral, and indicators adapted to be mounted in said column spaces and provided with time indicia adjustable to cooperate with said time numeral.

2. As a sub-combination in a report board having sockets, an indicator having a head mounted on a stem adapted to engage in the sockets of the boards, said head having a plate on its face, a rotatable rim member surrounding the head and bearing characters indicating divisions of an hour.

3. A report board comprising a plurality of vertical columns including transversely alined spaces having indicating marks and sockets, the column having hour numerals at their tops, designation members at one side of the board arranged in transverse alinement with the said spaces, panels on the opposite side of the board for storing indicators and displaying names of persons associated with said indicators, and a plurality of indicators stored in said panels and adapted to be engaged in the sockets of said spaces, each indicator bearing the name of a person and having an adjustable time indicating member.

4. A report board comprising a plurality of vertical columns having indications and including transversely alined spaces, indicators adapted to be mounted in said spaces and having identifying data, and an adjustable member carried by the indicator and provided with characters disposed to register with the column indications and qualify the same.

5. A report board comprising a plurality of vertical columns having indications and including transverse alined spaces formed with receiving recesses, an indicator comprising a plug and head, means upon the plug to prevent rotation thereof within the recess, and rotatable means upon the head provided with characters adapted to register with the column indications and qualify the same.

6. A report board comprising a plurality of vertical columns having indications and including transverse alined spaces formed with receiving recesses, an indicator comprising a plug and head, a key upon the plug entering a seat in the recess to prevent rotation therein, and a rotatable sleeve surrounding the head and provided with characters adapted to register with the column indications and qualify the same.

In testimony whereof I affix my signature.

EDWARD R. SPIEGEL.